(12) United States Patent
Tseng et al.

(10) Patent No.: US 9,377,314 B2
(45) Date of Patent: Jun. 28, 2016

(54) REDUCED NETWORK FLOW AND COMPUTATIONAL LOAD USING A SPATIAL AND TEMPORAL VARIABLE SCHEDULER

(71) Applicant: Ford Global Technologies, LLC, Dearborn, MI (US)

(72) Inventors: Fling Tseng, Ann Arbor, MI (US); Hsin-hsiang Yang, Ann Arbor, MI (US); Kwaku O. Prakah-Asante, Commerce Township, MI (US); Imad Hassan Makki, Dearborn Heights, MI (US); William David Treharne, Ypsilanti, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/243,424

(22) Filed: Apr. 2, 2014

(65) Prior Publication Data

US 2015/0285642 A1 Oct. 8, 2015

(51) Int. Cl.
*G01C 22/00* (2006.01)
*H04W 24/00* (2009.01)
*G08G 1/16* (2006.01)
*G01C 21/34* (2006.01)
*G01C 21/26* (2006.01)

(52) U.S. Cl.
CPC ............... *G01C 21/34* (2013.01); *G01C 21/26* (2013.01)

(58) Field of Classification Search
USPC .......................... 701/25; 455/456.3; 340/903
See application file for complete search history.

(56) References Cited

U.S. PATENT DOCUMENTS

| 5,491,475 | A  | * | 2/1996  | Rouse   | G08G 1/042     |
|           |    |   |         |         | 324/244        |
| 5,547,439 | A  | * | 8/1996  | Rawls   | A63B 24/00     |
|           |    |   |         |         | 482/3          |
| 6,862,524 | B1 | * | 3/2005  | Nagda   | G01C 21/3492   |
|           |    |   |         |         | 340/988        |
| 6,921,351 | B1 | * | 7/2005  | Hickman | A63B 24/0084   |
|           |    |   |         |         | 482/4          |
| 7,010,289 | B2 |   | 3/2006  | Jijina et al. |          |
| 7,047,804 | B1 | * | 5/2006  | Lawrence| A63B 69/16     |
|           |    |   |         |         | 73/170.01      |
| 7,268,700 | B1 | * | 9/2007  | Hoffberg| G08G 1/0104    |
|           |    |   |         |         | 340/539.17     |
| 7,298,289 | B1 | * | 11/2007 | Hoffberg| G01C 21/26     |
|           |    |   |         |         | 340/903        |
| 7,996,345 | B2 | * | 8/2011  | Golding | G01C 21/3484   |
|           |    |   |         |         | 706/14         |
| 8,385,964 | B2 | * | 2/2013  | Haney   | H04M 1/72519   |
|           |    |   |         |         | 455/404.1      |
| 8,855,847 | B2 | * | 10/2014 | Uehara  | G01C 21/3691   |
|           |    |   |         |         | 701/25         |

(Continued)

FOREIGN PATENT DOCUMENTS

KR 20040090001 10/2004
KR 20060053649 5/2006

OTHER PUBLICATIONS

Chen et al., "Dynamic Transmission Range in Inter-Vehicle Communication with Stop-and-Go Traffic", University of California, Irvine, 6 pages.

*Primary Examiner* — Thomas G Black
*Assistant Examiner* — Tyler Paige
(74) *Attorney, Agent, or Firm* — Frank A. MacKenzie; Bejin Bieneman PLC

(57) ABSTRACT

A vehicle includes a navigation system and a processing device. The navigation system is configured to identify a current location of the vehicle, a destination location, and a distance between the current location and the destination location. The processing device is configured to identify a task, associate the task to the destination location, and schedule the task according to the distance from the destination location.

17 Claims, 2 Drawing Sheets

(56) References Cited

U.S. PATENT DOCUMENTS

| | | | |
|---|---|---|---|
| 8,880,270 B1* | 11/2014 | Ferguson | B60W 30/00 701/23 |
| 2001/0029425 A1* | 10/2001 | Myr | G01C 21/3492 701/117 |
| 2003/0024310 A1* | 2/2003 | Montagnon | B62J 99/00 73/489 |
| 2005/0060069 A1* | 3/2005 | Breed | B60N 2/2863 701/408 |
| 2005/0261824 A1* | 11/2005 | Furukawa | G01C 21/26 701/533 |
| 2006/0040609 A1* | 2/2006 | Petschke | H04H 20/74 455/3.02 |
| 2006/0085125 A1* | 4/2006 | Shibata | G01C 21/365 701/414 |
| 2007/0087756 A1* | 4/2007 | Hoffberg | G06Q 10/0631 455/450 |
| 2007/0198179 A1* | 8/2007 | Ishikawa | G08G 1/096811 701/533 |
| 2008/0046174 A1* | 2/2008 | Johnson | G01C 21/28 701/533 |
| 2008/0140304 A1* | 6/2008 | Vaccaro | G08G 1/096716 701/117 |
| 2008/0243312 A1* | 10/2008 | Nakamura | G01C 21/26 701/1 |
| 2009/0043486 A1* | 2/2009 | Yang | G01C 21/3492 701/117 |
| 2011/0077855 A1* | 3/2011 | Sumizawa | G01C 21/34 701/533 |
| 2011/0133918 A1* | 6/2011 | Lee | B62J 99/00 340/436 |
| 2011/0282621 A1* | 11/2011 | Simpson | G07C 1/24 702/149 |
| 2011/0313633 A1* | 12/2011 | Nath | G08G 1/163 701/70 |
| 2012/0226440 A1* | 9/2012 | Nagda | G08G 1/202 701/465 |
| 2012/0265380 A1* | 10/2012 | Kuwata | G05D 1/0206 701/21 |
| 2014/0081690 A1* | 3/2014 | Winters | G06Q 10/063114 705/7.15 |
| 2014/0172135 A1* | 6/2014 | Eisner | G06F 15/17306 700/91 |
| 2014/0277637 A1* | 9/2014 | Ventura | A63K 3/00 700/91 |
| 2015/0005010 A1* | 1/2015 | Zhang | H04W 4/023 455/456.3 |

* cited by examiner

REDUCED NETWORK FLOW AND COMPUTATIONAL LOAD USING A SPATIAL AND TEMPORAL VARIABLE SCHEDULER

BACKGROUND

Vehicles are becoming increasingly dependent upon real-time information available from remote sources. Receiving and processing such information in real time uses valuable resources such as in-car data bandwidth, computing, and permanent/temporary storage resources. Thus, as vehicle systems become more complex, the network traffic to and from the vehicle, as well as the computational load of vehicle systems, increases.

DETAILED DESCRIPTION

An exemplary vehicle includes a navigation system and a processing device. The navigation system is configured to identify a current location of the vehicle, a destination location, and a distance between the current location and the destination location, which may include an ultimate destination, waypoints, or both. The processing device is configured to identify a task, associate the task to the destination location, and schedule the task according to the distance from the destination location. The vehicle reduces the network flow and computational load by executing location-dependent tasks less frequently when the vehicle is far from the destination location and more frequently as the vehicle nears the destination location.

The system shown in the FIGS. may take many different forms and include multiple and/or alternate components and facilities. The exemplary components illustrated are not intended to be limiting. Indeed, additional or alternative components and/or implementations may be used.

Figure 1:
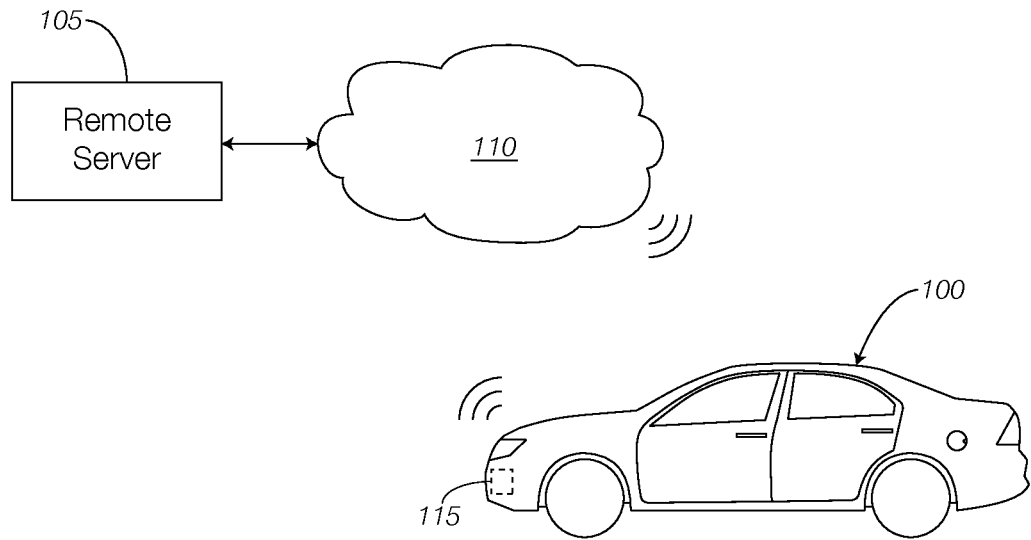
FIG. 1 illustrates an exemplary vehicle that implements a spatial and temporal variable scheduler.

As illustrated in FIG. 1, the vehicle 100 is configured to reduce network flow and computational load associated with communications with a remote server 105 over a communication network 110. Additionally or in the alternative, the vehicle 100 may be configured to reduce computational load associated with reading and processing signals received from one or more sensors 115, as discussed in greater detail below. Although illustrated as a sedan, the vehicle 100 may include any passenger or commercial vehicle such as a car, a truck, a sport utility vehicle, a hybrid vehicle, a taxi, a bus, etc. In some possible approaches, the vehicle 100 is an autonomous vehicle configured to operate in an autonomous (e.g., driverless) mode, a partially autonomous mode, and/or a non-autonomous mode.

The remote server 105 may be configured to store and/or transmit information pertaining to the vehicle 100. Examples of such information may include software, software updates, and/or firmware associated with one or more components of the vehicle 100 including the engine controller, the body controller, the transmission controller, the autonomous mode controller, the navigation system, the entertainment system, the climate control system, or the like. For example, the remote server 105 may be configured to send traffic information to the vehicle 100 for use by the navigation system. The remote server 105 may be configured to transmit and/or receive data over a communication network 110 in accordance with any number of communication protocols. In some possible implementations, the remote server 105 may be configured to conduct data transfers in response to a query from the vehicle 100. In other possible approaches, the remote server 105 may be configured to conduct data transfers according to a schedule or without a request from the vehicle 100.

The sensors 115 may be configured to output signals for use by any number of vehicle subsystems. The sensor signals may represent characteristics of various vehicle 100 components and/or the environment around the vehicle 100. For example, one sensor may be configured to measure a battery state-of-charge while another sensor may be configured to measure the amount of ambient light around the vehicle 100. Other sensors 115 may be used to measure the speed of the vehicle 100 and/or other operating conditions. In the context of an autonomous vehicle, the sensors 115 may include any number of devices configured to generate signals that help navigate the vehicle 100 while the vehicle 100 is operating in the autonomous (e.g., driverless) mode. Examples of autonomous driving sensors 115 may include a radar sensor, a lidar sensor, a vision sensor, or the like. The sensors 115 help the vehicle 100 "see" the roadway and the vehicle 100 surroundings and/or negotiate various obstacles while the vehicle 100 is operating in the autonomous mode.

Figure 2:
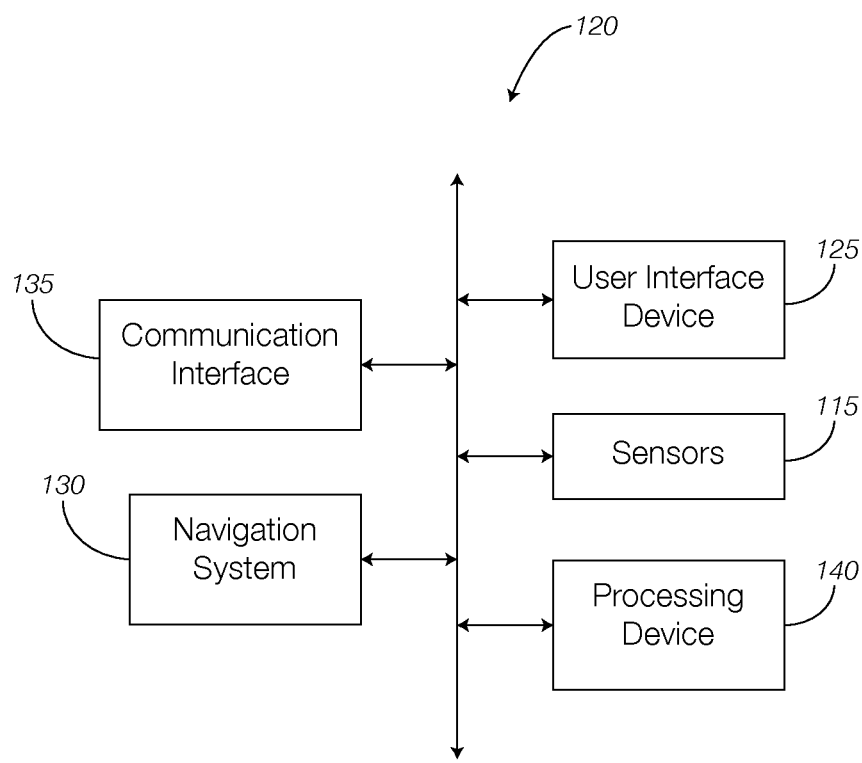
FIG. 2 is a block diagram of an exemplary system that may be incorporated into the vehicle of FIG. 1.

FIG. 2 is a block diagram of an exemplary system 120 that may be incorporated into the vehicle 100 of FIG. 1. As illustrated, the system 120 includes a user interface device 125, a navigation system 130, a communication interface 135, and a processing device 140. The system 120 is configured to receive signals generated by one or more of the sensors 115 shown and discussed above with regard to FIG. 1.

The user interface device 125 may be configured to present information to a user, such as a driver, during operation of the vehicle 100. Moreover, the user interface device 125 may be configured to receive user inputs. Thus, the user interface device 125 may be located in the passenger compartment of the vehicle 100. In some possible approaches, the user interface device 125 may include a touch-sensitive display screen.

The navigation system 130 may be configured to determine a position of the vehicle 100, such as a current location of the vehicle 100. The navigation system 130 may include a Global Positioning System (GPS) receiver configured to triangulate the position of the vehicle 100 relative to satellites or terrestrial based transmitter towers. The navigation system 130, therefore, may be configured for wireless communication. The navigation system 130 may be further configured to develop routes from the current location to a destination location, as well as display a map and present driving directions to the destination location via, e.g., the user interface device 125. The "destination location" may refer to an ultimate destination or a waypoint. An example of an ultimate destination might be a driver's home or work address, or another point of interest such as an airport, stadium, or the like. The waypoint might include a brief stop along the way to the ultimate destination. In other words, a waypoint may be one of a number of sequential destination locations. An example of a waypoint may include a gas station, store, or other point of interest. The navigation system 130 may adjust the route to accommodate any waypoints desired by the driver. In some instances, the navigation system 130 may develop the route according to a user preference. Examples of user preferences may include maximizing fuel efficiency, reducing travel time, travelling the shortest distance, or the like. In addition to developing the route, the navigation system 130 may be configured to calculate a distance between the current location and the destination location, and output the distance to one or more other components of the vehicle 100, such as the processing device 140.

The communication interface 135 may be configured to facilitate wired and/or wireless communication between the components of the vehicle 100 and other devices, such as the remote server 105. For instance, the communication interface 135 may be configured to receive messages from, and transmit messages to, a cellular provider's tower and the vehicle's Telematics Service Delivery Network (SDN) that, in turn, establishes communication with a user's mobile device such as a cell phone, a tablet computer, a laptop computer, a fob, or any other electronic device configured for wireless communication via a secondary or the same cellular provider. Cellular communication to the vehicle's telematics transceiver through the SDN may also be initiated from an internet connected device such as a PC, Laptop, Notebook, or WiFi connected phone. The communication interface 135 may also be configured to communicate directly from the vehicle 100 to the user's remote device or any other device using any number of communication protocols such as Bluetooth®, Bluetooth® Low Energy, or WiFi. Accordingly, the communication interface 135 may be configured to receive messages from and/or transmit messages to a remote server 105.

The processing device 140 may be configured to identify one or more tasks, associate some or all tasks to a particular destination location, which as discussed above may include the ultimate destination and/or waypoints, and schedule associated tasks according to the distance of the vehicle 100 from the destination location. In some possible implementations, the processing device 140 may associate the tasks to particular waypoints (i.e., sequential destination locations along a route to an ultimate destination) and schedule the associated tasks accordingly. Examples of tasks may include sampling signals from one or more sensors 115, communicating with the remote server 105, operating the vehicle 100 in an autonomous or partially autonomous mode, etc. The processing device 140 may be configured to schedule the tasks to occur at a predetermined frequency based on, e.g., the distance from the destination location. In some possible implementations, the frequency of the task may increase as the distance to the destination location decreases. The processing device 140 may be further configured to consider the speed of the vehicle 100 when scheduling the task. For instance, some tasks may be scheduled to occur more frequently as the speed of the vehicle 100 increases.

The system 120 may be incorporated into any number of vehicle 100 subsystems. For example, the system 120 may be used in accordance with a "green zone" driving feature that allows a user to designate certain areas as "green zones" where the vehicle 100 will only operate in a fuel efficient mode, such as an electric mode in the case of hybrid vehicles. As the vehicle 100 approaches the designated "green zone," which could include an ultimate destination and/or one or more waypoints on the route to the ultimate destination, the vehicle 100 may schedule a task such as assessing the battery state-of-charge (SOC). The SOC may be evaluated less frequently (e.g., once per minute) when the vehicle 100 is several miles (e.g., over 10 miles) from the "green zone." When the vehicle 100 is within a few miles of the "green zone," the SOC may be evaluated more frequently to ensure that the battery is charging, if necessary, and that sufficient battery power will be available to propel the vehicle 100 by the time the vehicle 100 reaches the "green zone." Instead of relying on designated "green zones," the SOC may be evaluated more frequently as the vehicle 100 approaches common destinations such as the user's home or work address.

Alternatively or in addition, the system 120 may be incorporated into a communication subsystem. For example, the vehicle 100 may receive traffic updates from the remote server 105. The processing device 140 may schedule tasks such as receiving traffic updates near the current location to occur more frequently than traffic updates for locations that are further away. For instance, traffic updates for areas near the current location and along a route to the destination location may occur every few seconds while traffic updates for areas more than, e.g., 10 miles away along the route may occur every minute.

Figure 3:
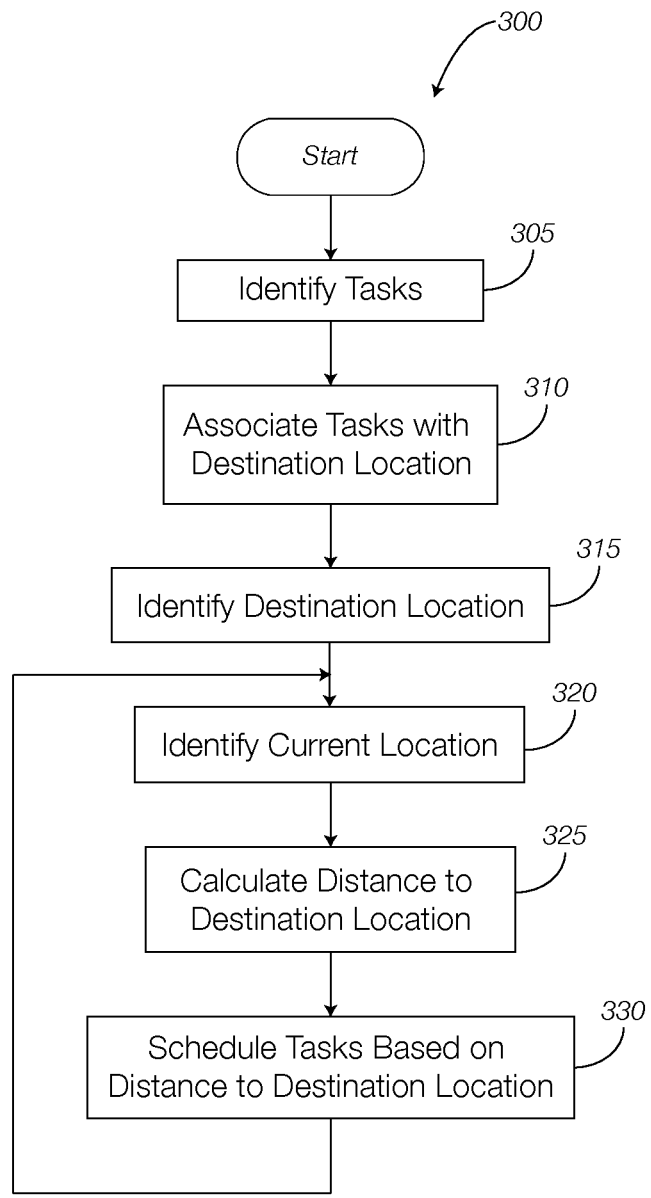
FIG. 3 is a flowchart of an exemplary process that may be used to reduce the network flow and computational load on the vehicle.

FIG. 3 is a flowchart of an exemplary process 300 that may be implemented by one or more components of the vehicle 100 of FIG. 1.

At block 305, the processing device 140 may identify one or more tasks. Examples of tasks may include sampling signals from one or more sensors 115, communicating with the remote server 105, operating the vehicle 100 in an autonomous or partially autonomous mode, etc. For instance, the tasks may include assessing a battery SOC, receiving traffic updates from the remote server 105, or the like.

At block 310, the processing device 140 may identify which tasks will be executed in accordance with a proximity of the vehicle 100 to a destination location. Not all tasks may be associated with a destination location. For instance, tasks associated with turning on the brake lights when the vehicle 100 is braking may occur independently of how close the vehicle 100 is to any particular destination location. Other tasks, however, such as assessing the battery SOC and receiving traffic updates, may depend on the proximity of the vehicle 100 to the destination location.

At block 315, the processing device 140 or the navigation system 130 may identify the destination location of the vehicle 100. The destination location may be determined from a user input provided to, e.g., the user input device. Alternatively, the destination location may be contextually inferred. For instance, the processing device 140 may determine a user's home and work locations if input by the user or based on the user's typical driving habits. If the vehicle 100 is at the user's work location at 5 pm on a weekday, the processing device 140 may determine that the next likely destination is the user's home location.

At block 320, the processing device 140 may identify the current location of the vehicle 100. The current location may be identified from signals received from the navigation system 130.

At block 325, the processing device 140 or the navigation system 130 may calculate the distance between the current location and the destination location. The distance may be represented in terms of the distance along a route from the current location to the destination location, the travel time between the current location and the destination location, or a line-of-sight distance between the current location and the destination location.

At block 330, the processing device 140 may schedule the tasks identified at block 310 to occur in accordance with the distance to the destination location. For example, the processing device 140 may schedule such tasks to occur at a predetermined frequency that, in some possible implementations, is based on the distance to the destination location. That is, the frequency may increase as the vehicle 100 nears the destination location (i.e., the distance to the destination location decreases). After block 330, the process 300 may continue at block 320 so that the distance to the destination location may be updated, which in turn may cause the frequency to be updated at block 330. Although not shown, the process 300 may alternatively return to block 315 so that a new destination location may be identified, which may occur if the driver has selected a new destination location or added a waypoint to the current route.

In general, computing systems and/or devices, such as the remote server 105, the user interface device 125, the navigation system 130, and the processing device 140, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle comprising:
    a navigation system configured to identify a current location of the vehicle, a destination location, and a distance between the current location and the destination location; and
    a processing device programmed to identify a task, associate the task to the destination location, and schedule the task to be executed at a predetermined frequency that varies with the distance to the destination location,
    wherein the processing device is programmed to determine the distance to the destination location at the same predetermined frequency as the execution of the task.

2. The vehicle of claim 1, wherein the predetermined frequency increases as the distance to the destination location decreases.

3. The vehicle of claim 1, wherein the task includes sampling a sensor signal.

4. The vehicle of claim 1, wherein the task includes communicating with a remote server.

5. The vehicle of claim 1, wherein the task includes operating the vehicle in an autonomous mode.

6. The vehicle of claim 1, wherein the task is scheduled in accordance with a speed of the vehicle.

7. The vehicle of claim 1, wherein the processing device is programmed to update the distance to the destination location each time the task occurs.

8. A vehicle system comprising:
    a processing device configured to identify a task, associate the task to a destination location, and schedule the task to be executed at a predetermined frequency that varies according to a distance between a current location of a vehicle and the destination location,
    wherein the processing device is programmed to determine the distance to the destination location at the same predetermined frequency as the execution of the task.

9. The vehicle system of claim 8, wherein the predetermined frequency increases as the distance to the destination location decreases.

10. The vehicle system of claim 8, wherein the task includes sampling a sensor signal.

11. The vehicle system of claim 8, wherein the task includes communicating with a remote server.

12. The vehicle system of claim 8, wherein the task includes operating the vehicle in an autonomous mode.

13. The vehicle system of claim 8, wherein the task is scheduled in accordance with a speed of the vehicle.

14. The vehicle system of claim 8, wherein the processing device is programmed to update the distance to the destination location each time the task occurs.

15. A method comprising:
    identifying a current location of a vehicle;
    identifying a destination location of the vehicle;
    calculating a distance between the current location and the destination location;
    identifying a task; and
    scheduling the task to be executed at a predetermined frequency that varies according to the distance from the destination location; and
    determining the distance to the destination location at the same predetermined frequency as the execution of the task.

16. The method of claim 15, wherein the predetermined frequency increases as the distance to the destination location decreases.

17. The method of claim 15, wherein updating the distance to the destination location includes updating the distance to the destination location each time the task occurs.

* * * * *